(No Model.)  4 Sheets—Sheet 1.

H. J. HAIGHT.
WARMING DEVICE FOR POULTRY COOPS.

No. 356,120. Patented Jan. 18, 1887.

WITNESSES:
Norris A. Clark.
Richard C. Laurie

INVENTOR.
Henry J. Haight,
By J. S. Brown,
his ATT'Y.

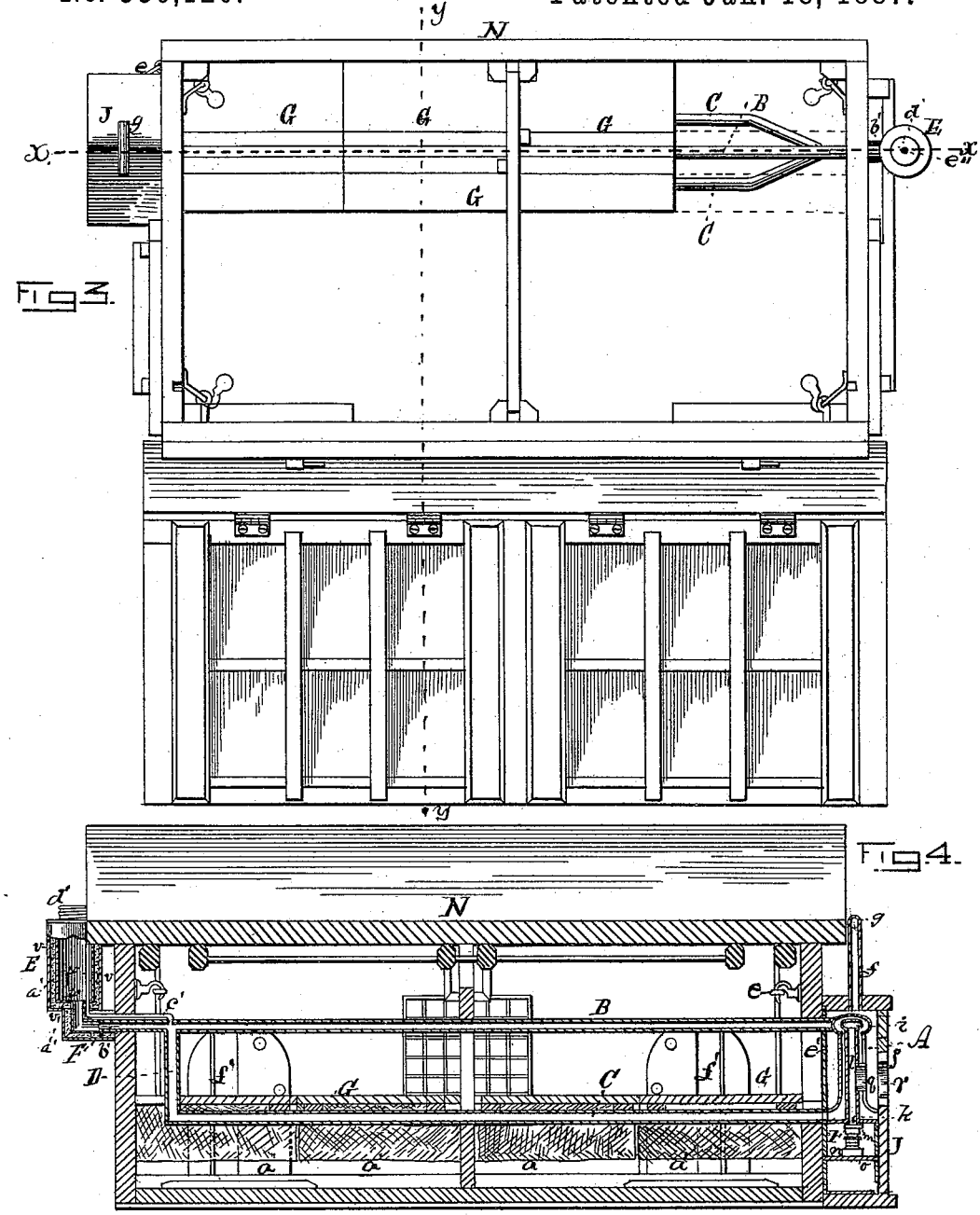

(No Model.) 4 Sheets—Sheet 3.
H. J. HAIGHT.
WARMING DEVICE FOR POULTRY COOPS.
No. 356,120. Patented Jan. 18, 1887.
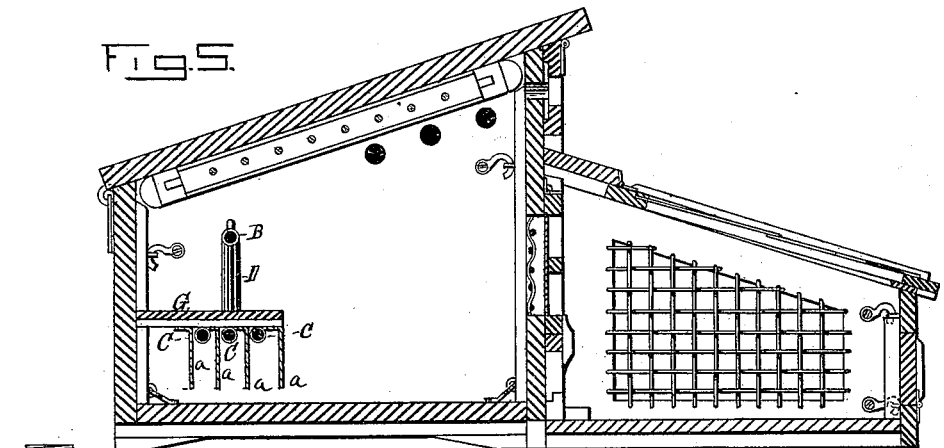
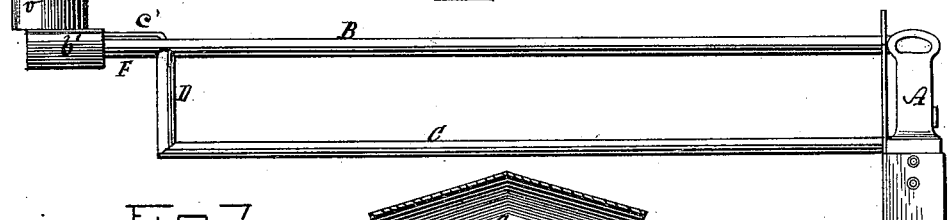
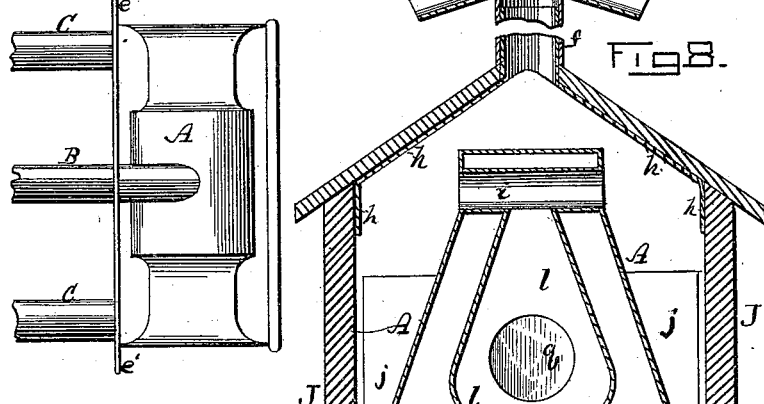
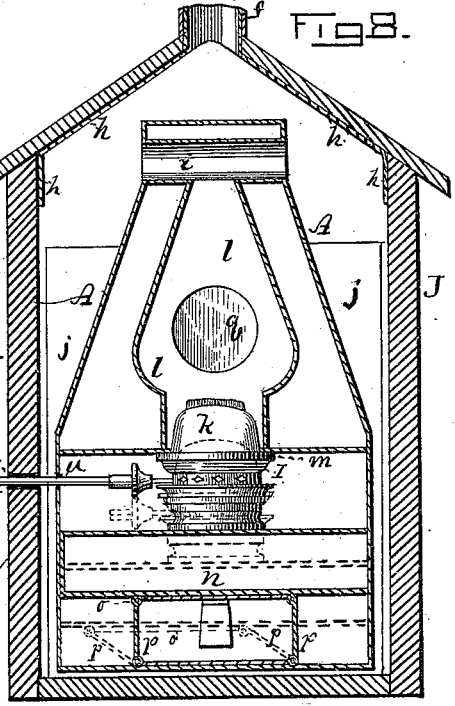
WITNESSES:
Norris A. Clark.
Richard C. Laurie
INVENTOR.
Henry J. Haight,
By J. S. Brown,
his ATTY.

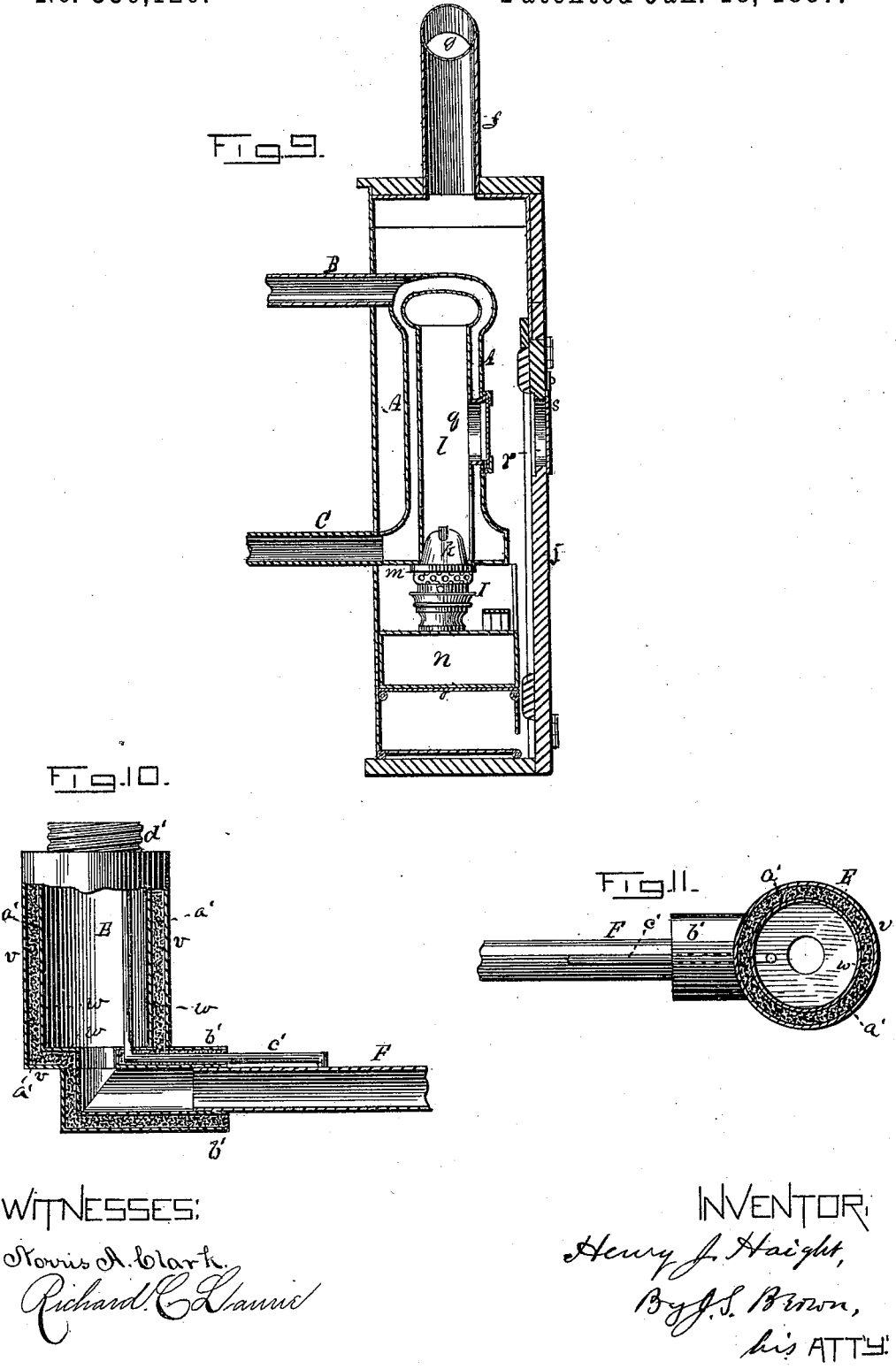

UNITED STATES PATENT OFFICE.

HENRY J. HAIGHT, OF NEW YORK, N. Y.

WARMING DEVICE FOR POULTRY-COOPS.

SPECIFICATION forming part of Letters Patent No. 356,120, dated January 18, 1887.

Application filed December 30, 1884. Serial No. 151,560. (No model.)

*To all whom it may concern:*

Be it known that I, HENRY J. HAIGHT, a citizen of the United States, and a resident of the city, county, and State of New York, have invented an Improved Brooder-Warming Device for Poultry-Coops; and I do hereby declare that the following is a full and exact description thereof, reference being had to the accompanying drawings, making part of this specification.

My invention consists in an improved brooder-warming device adapted to be applied to a poultry-coop and to be removed therefrom at will, the special features of which device are hereinafter set forth.

Figure 1:
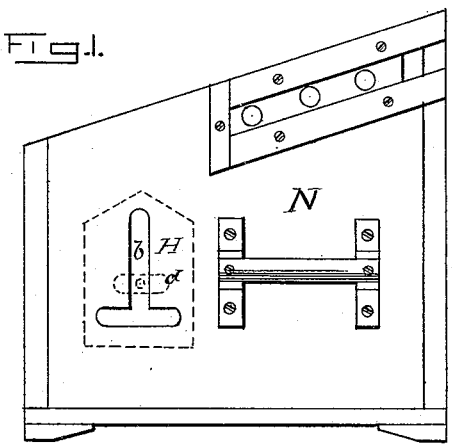
Figure 2:
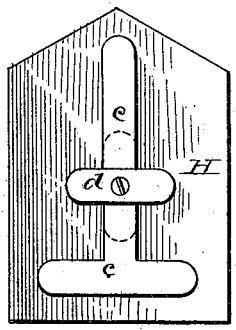
Figure 12:
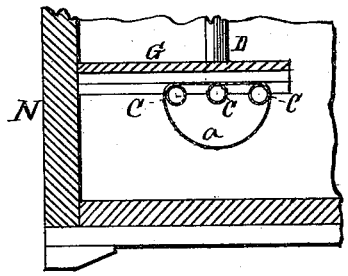

Figure 1 of the accompanying drawings represents an end view of a poultry-coop constructed to receive the brooder-warming device herein described; Fig. 2, an inside view of a cover used to close the opening in the coop through which the brooder-warming device is admitted into the coop when the said device is removed from the coop; Fig. 3, a top view of the coop and brooder-warming device attached thereto, the top or roof of the coop being removed to show the part of the brooder-warming device inside thereof; Fig. 4, a vertical section of the brooder and coop through the center of the brooder-warming device, the section being in a plane indicated by the line $x\,x$, Figs. 1 and 3; Fig. 5, a vertical section of the whole combined apparatus in a plane indicated by the line $y\,y$, Fig. 3; Fig. 6, a side view of the brooder-warming device without the box which incloses and protects the boiler of the same; Fig. 7, a top view of the boiler and a portion of the warm-water-circulating tubes or pipes connected therewith; Fig. 8, a transverse vertical section, on an enlarged scale, of the boiler and inclosing-box; Fig. 9, a vertical section of the same in a plane at right angles to the section in Fig. 8; Fig. 10, a central vertical section of the water-reservoir or feeding-tank used with the brooder-warming device, showing its connection with the warm-water-circulating tubes or pipes; Fig. 11, a horizontal section of the same, looking down also upon the tube-connection thereof; Fig. 12, a transverse section of a portion of the brooder-warming device and coop, showing a modification of the construction represented in Fig. 5.

Like letters designate corresponding parts in all of the figures.

The portable or removable brooder-warming device is composed of a boiler, A, to be located outside of the coop, an upper hot-water tube or pipe, B, extending from the interior of the part of the boiler in a horizontal direction, of sufficient length to reach into the coop through one end nearly or quite to the opposite end thereof; three (more or fewer) return warm-water tubes or pipes, C C C, arranged horizontally and substantially in one horizontal plane below the tube or pipe B, and entering the lower part of the boiler, the lower and upper tubes or pipes being connected by a connecting tube or pipe or pipes, D, Figs. 4 and 6; a water-feeding tank or reservoir, E, located outside of the coop at the end opposite to the boiler end thereof, and communicating with the water-circulating tubes or pipes above named by a connecting-pipe, F; separately-removable boards G G, covering the warm-water pipes C C C, and lined with cloths $a\,a$, or other soft warm material, to form "artificial mothers," under which the young chickens are brooded and kept warm by the said tubes or pipes. These cloths may hang down in strips separately by the side of the several tubes or pipes nearly to the floor of the coop below, as shown in Fig. 5, or may hang in a loose fold around all of the tubes together, as shown by the modification in Fig. 12. The boards are preferably in sections or parts, as shown in Fig. 3, one section thereof being removed, as shown therein. Thus any part or section may be removed at a time without disturbing the others.

The feed-water reservoir E is made removable from the other parts of the warming device, so that in applying the brooding-warmer to the coop provision only has to be made for inserting the warming-pipes B, C C C, and D; and with the construction herein represented and described only a narrow inlet or aperture, $b$, in one end of the coop of the form shown in Fig. 1 is required for the purpose of admitting the said pipes and a simple hole in the other end of the coop for admitting the connecting-pipe F of the water-feeder E. The aperture $b$, when the brooder-warming device is removed from the coop, only requires to be closed with a cover, H, (represented in Fig. 2 and outlined in position by dotted lines in Fig. 1,) consisting of a board having a projection, $c$, on its inner surface of proper form and size to enter and close the aperture, it being, when inserted in the aperture, held therein by a button, $d$, turned across the aperture on the inside of the coop, as indicated in the said Fig. 1.

The boiler A, having a compartment below for the lamp I, which heats the water in it, and is inclosed except at the front side of the compartment, is housed and completely shielded from the weather, outside of the coop, by an inclosing-box, J, which is fastened, when in place, to the end of the coop by hooks and eyes $e\ e$, or equivalent means. The back side of the box is open; but the boiler has or may have a flange, $e'$, Fig. 7, at its back side wide enough to cover the open rear side of the box, which also shuts close up to the end of the coop when it is in place. This box protects the boiler from much loss of heat, which otherwise would be inevitable from exposure to the outside air, and it also protects the lamp-flame from being extinguished or disturbed by the wind. It has a smoke-pipe, $f$, extending upward from the top, protected by a suitable cap, $g$, as shown, or otherwise, to protect it from rain and wind. The upper part or roof of the box is lined with sheet metal, $h$, as shown in Fig. 8, to protect it from the heat of the products of combustion arising from the lamp and passing out of the flue $i$ of the boiler. The box also has a door, $j$, in the front side for gaining access to the boiler, and particularly to the lamp I. That this lamp may be completely shielded in its position and its flame made even and constant, its burner $k$ is inserted in the lower part of the interior heating-chamber, $l$, of the boiler, a rim, $m$, of the lamp-body fitting up tightly against the bottom of the boiler.

For removing the lamp to trim or replace the wick, or any other purpose, the base or oil-reservoir $n$ thereof rests on a platform, $o$, which is jointed to two swinging uprights, $p\ p$, jointed at the bottom of the lamp-chamber, and so arranged that when the lamp is raised into position the uprights will be in a vertical position, and thus support the platform and lamp, as shown by full lines in Fig. 8; and when the uprights are swung down into a horizontal position the lamp will be sufficiently lowered to remove or to trim its wick. The uprights and platform with the lamp are shown partly lowered by dotted lines in the said Fig. 8. The lamp-burner being thus entirely inclosed in the interior heating-chamber of the boiler, I provide for viewing the flame of the lamp at all times, so as to see that it is properly regulated without removing or disturbing the lamp, by placing a "bull's-eye" or sight-opening, $g$, in the front side of the boiler opposite to the position of the lamp-flame, the opening extending through both the exterior and interior wall of the boiler, as shown in Figs. 4 and 9, a tubular connection being formed between the two walls, and opposite to this sight-aperture of the boiler arranging an aperture, $r$, in the front side or door of the inclosing-box, the latter opening being closed by a swinging lid, $s$, Fig. 9, except when the flame of the lamp is to be viewed; also, the wick of the lamp is regulated from the outside without disturbing the lamp itself or opening the box by means of a long key, M, inserted in opposite openings, $t\ u$, respectively, in one side of the box and one side of the lamp-chamber, as shown in Fig. 8, so as to reach the shaft of the lamp-wick regulator.

The feed-water reservoir or tank E, which is coupled to the connecting-pipe F of the brooder-warming device, and is located outside of the coop, being thus also exposed to the outer air, is constructed so as to subject it to as little loss of heat from the circulating water within as possible, substantially in the manner shown in Figs. 4, 10, and 11. The body of the reservoir is made of two metallic walls, $v\ w$, at the sides and bottom, and the intermediate space, $a'$, is filled with wood, felt, or other suitable material which is a slow conductor of heat, and the portion of the connecting-pipe F outside of the coop is also surrounded by a double-walled tube, $b'$, similarly filled with a slow heat-conducting material. An air-vent pipe, $c'$, extends from the top of the connecting-pipe F outside thereof up into the interior of the reservoir, reaching to nearly the top of the same, as shown most clearly in Fig. 10, to allow the escape of air from the warming-pipes of the brooder as water is poured into the reservoir and runs into the said pipes.

The cap $d'$ of the reservoir is ordinarily to have a very small vent-hole, $e''$, Fig. 3, through its top, to allow as little loss of water by evaporation as practicable. Thus the replenishing of the brooder-warmer with water is very conveniently accomplished without disturbing the brooder within the coop.

The coop N requires no special construction to adapt it to this new use, except to provide it with apertures in its ends to receive the brooder-warmer, as before set forth; but I represent such a coop as has previously been patented by me, No. 280,815, and I know no better construction for this use.

I claim as my invention—

1. In combination with a poultry-coop, a brooder-warming device constructed with a boiler, A, located outside of the coop, and warming-pipes B C C C, attached to the boiler and removably inserted in the coop through a narrow aperture, $b$, in one side of the coop, just sufficient in size to admit the said pipes connected together, substantially as herein set forth, whereby the coop may be used with or without the said warming device at will, for the purpose herein specified.

2. In combination with a poultry-coop, a brooder-warming device constructed with a boiler, A, located at one side of the coop, outside of the same, warming-pipes B C C C, attached to the boiler and removably inserted in the coop, and a feed-water reservoir, E, located outside of the coop on the opposite side to the boiler, and removably connected with the said warming-pipes, substantially as and for the purpose herein specified.

3. In combination with a poultry-coop, a brooder-warming device constructed with a boiler, A, located outside of the coop, inclosed within a separate housing-box, J, and with warming-pipes B C C C, attached to the boiler and removably inserted in the coop, substantially as and for the purpose herein specified.

4. In combination with a poultry-coop, a brooder-warming device constructed with a boiler, A, and lamp K, located outside of the coop and in a separate housing-case, J, and with warming-pipes B C C C, attached to the boiler and removably inserted in the coop, substantially as and for the purpose herein specified.

5. In combination with a poultry-coop, a brooder-warming device constructed with a boiler, A, and lamp K, located outside of the coop in a separate housing-case, J, the said boiler and case being provided with apertures in one side of each, and in line with each other, to enable the attendant to see the flame of the lamp inside of the boiler, substantially as herein specified.

6. In combination with a poultry-coop, a brooder-warming device constructed with a boiler, A, located outside of the coop and housed in a separate case, heating-pipes removably inserted in the coop, and a feed-water reservoir, E, located outside of the coop, and having double walls with a slow heat-conducting material between them, for the purpose herein specified.

HENRY J. HAIGHT.

Witnesses:
  C. S. NEWELL,
  S. D. NEWKIRK.